120,999

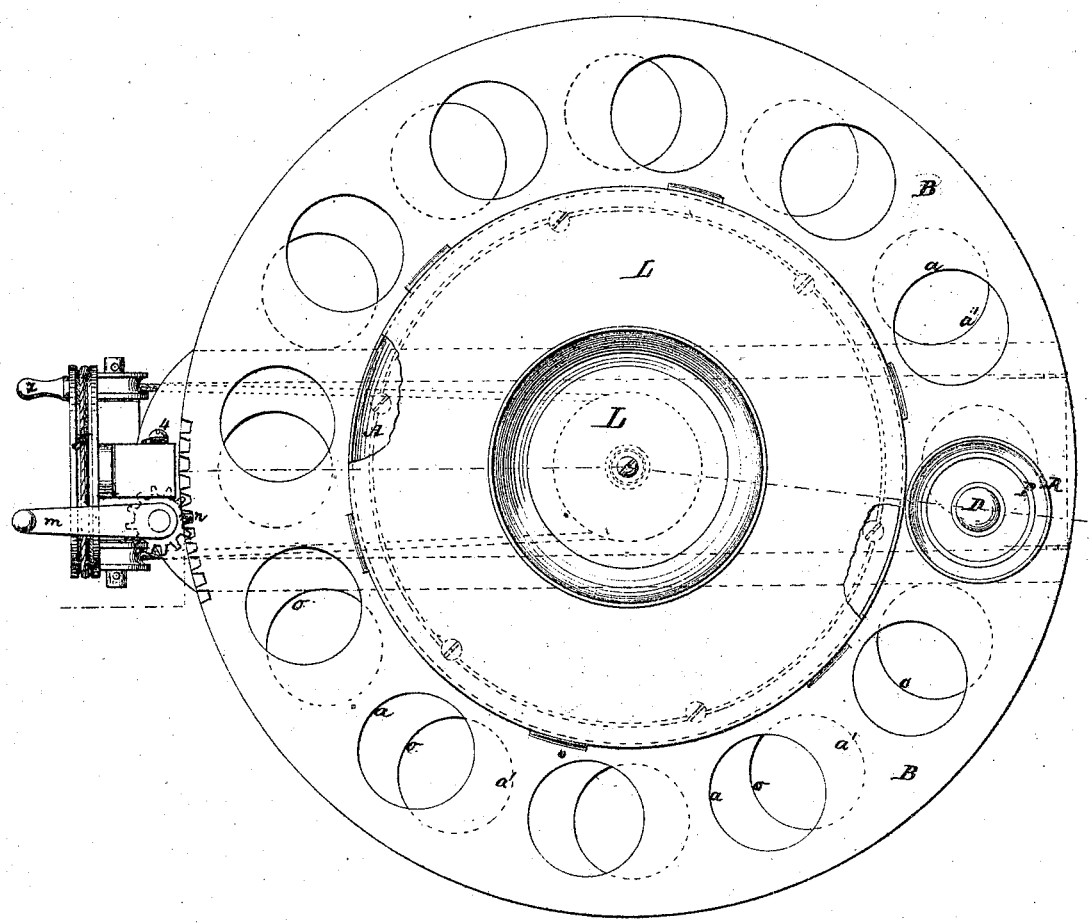

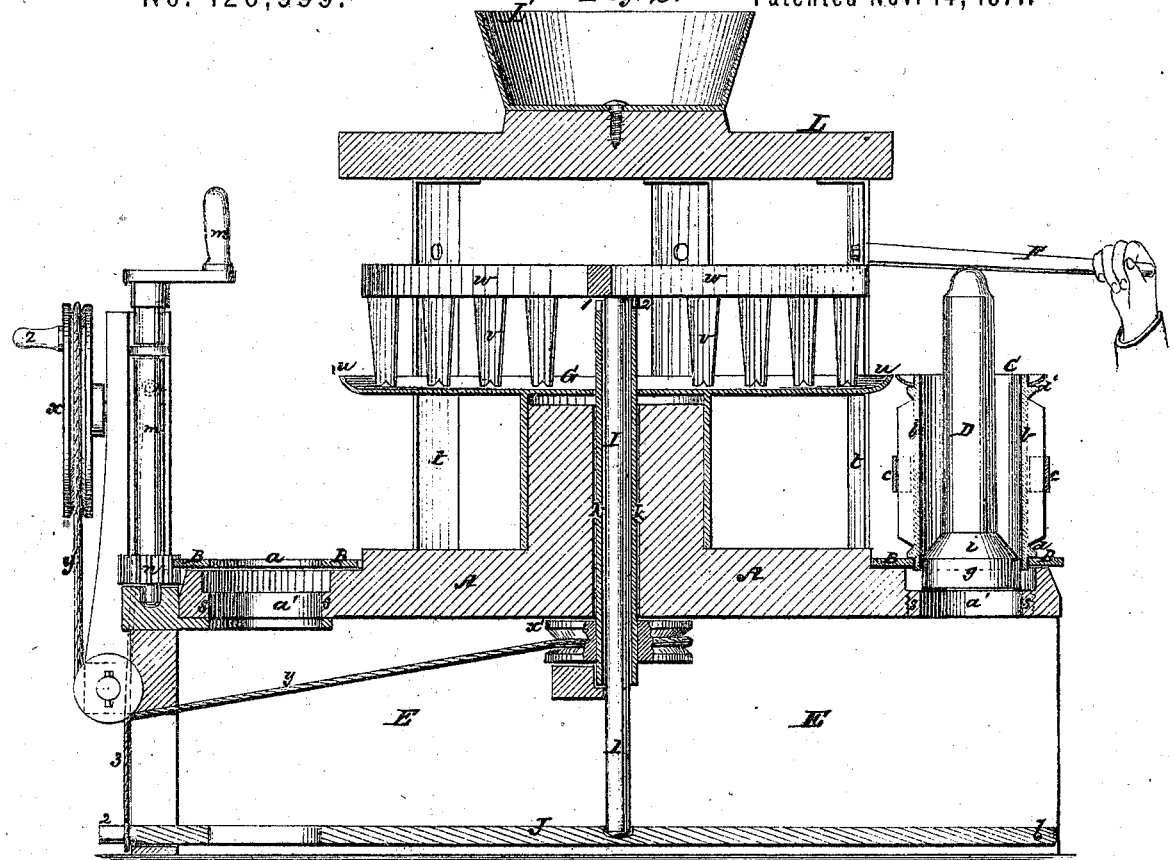

UNITED STATES PATENT OFFICE.

MASON R. PIERCE, OF NEW YORK, N. Y.

IMPROVEMENT IN DRAIN-PIPE MACHINES.

Specification forming part of Letters Patent No. 120,999, dated November 14, 1871.

*To all whom it may concern:*

Be it known that I, MASON R. PIERCE, of the city, county, and State of New York, have invented a new and Improved Apparatus for Molding Pipes and Tubes for Drains, Flues, and other analogous purposes, and also new and useful machinery to be employed when desired in connection therewith; and I hereby declare that the following is a full, clear, and exact description thereof, reference being had to the drawing which accompanies and forms a part of this specification.

Letters Patent of the United States were, on the 1st of August, 1854, obtained by Bradford S. Pierce and Charles M. Pierce for an improvement in molds for cement or earthen tubes, consisting principally of what is termed in said patent a spring-case, to be used in combination with a core therein described, for the purpose of molding pipes and tubes of the kind mentioned. In making use of said improvement it has been necessary, after the pipe or tube was molded, to remove the mold-case, with the pipe and core in it, from the platform or other support upon which it was sustained while the molding was being performed, and to lay it down in a horizontal position, so that the core might be removed by means of blows from a sledge or maul; but as, at this stage of the manipulation, the material of the pipe would be in a soft and plastic state, the core could not be removed immediately, lest the pipe should sink or collapse and become unserviceable. Therefore it has been customary to wait a short time to permit the material to "set" somewhat before the core was taken out. When, however, the set had taken place to much extent, the jar of the blows employed to remove the core would frequently crack the pipe and spoil it. In addition to this, if the pipe were larger in diameter, say eight inches or upward, its own weight would, after the core was extracted, generally cause it to sag and become more or less oval in shape, and would also frequently crack it, thereby rendering it unmarketable and often wholly unfit for use. These evils were of importance, yet, notwithstanding them, this apparatus was of considerable utility for the purposes for which it was designed.

In order to remedy these injurious consequences the same Bradford S. Pierce and myself obtained, on the 19th of April, 1859, Letters Patent of the United States for improvements in molds for the manufacture of pipes or tubes for drains or other purposes. These Letters Patent were reissued on the 27th of April, 1869, and in that reissue what we termed a core-socket is described as the means whereby the defects of the above-mentioned B. S. and C. M. Pierce's patent of 1854 may be avoided, the functions and essential features of said core-socket being therein stated to be as follows: That it shall hold the lower end of the core at the desired distance from the case, and that it shall form or shape one end of the pipe, and shall have an aperture in it through which the core can be discharged after the pipe is molded; that it shall support both the case and the pipe, so that when the core is discharged through the aperture in the socket no cracking of the pipe or injury to it can ensue; and so that the pipe, after it is finished, can be carried away to a convenient situation to be removed from the socket and case in order to mature for use; and, finally, that it shall be adapted to enable the processes of molding and finishing the pipe and of discharging the core from the other parts of the mold to be all performed at the same place in the apparatus. The combination of this core-socket with the other parts of the mold fully remedied the imperfections of the B. S. and C. M. Pierce invention, and it has always answered well in practice. From the foregoing statement of the characteristics of this core-socket, and by reference to the reissued Letters Patent mentioned, it will be perceived that it possesses four peculiarities: first, it must hold the core at the proper distance from the internal surface of the mold-case; second, it must form the lower end of the pipe; third, it must support both the case and the core; and fourth, it must permit the core to pass through it to be discharged.

My present apparatus is designed to accomplish, without the employment of any core-socket or equivalent device, all the results which the core-socket accomplishes. To this end, the first part of my invention consists of a mold for molding drain-pipe and other analogous articles composed of a case capable of being closed and opened around a core, with suitable space between the two to receive the molding material, a core adapted to be held centrally or eccentrically within the case by the inside surface of the latter, and suited to sustain a drain-pipe to form its lower end when it is being molded, and a suitable platform or case-supporter and a suitable and separate base or core-supporter, one or the other of which is movable in such a manner as to permit the core to be discharged from the mold-case after a pipe has been molded without requiring the case to be removed from the platform or support upon which it rested during the molding operation, and without requiring the use of a core-socket. The second part of my invention consists of what I term a mixing-table, elevated above the mold or molds, and combined with what I term mixing-plows in such a manner that the pipe material can be thoroughly mixed by the plows upon the table, and that the plows can then be raised above the mixed material, so as to be out of the way of the workman while he is placing the material in the molds.

In the accompanying drawing, Figure 1 is a plan view of one form of my apparatus which may be used with success. Fig. 2 is a vertical central section of the same, showing a mold in position, and also showing a convenient mode of forcing the core downward to discharge it from the mold and pipe. Fig. 3 is a vertical central section of a mold with all its parts and appendages complete, and in the position in which they are when in use. Fig. 4 is a similar section of the same mold, with a molded and finished pipe within it; and Figs. 5, 6, and 7 are detail views of some the parts and appendages of the mold.

Like parts in the different figures are denoted by like letters.

In the form of the apparatus represented in the drawing, A is the base-plate or bed of a machine which is designed to receive numerous molds, so as to concentrate them within a convenient space, in order that they may be readily filled in a short time, and thereby increase the product of the workmen. Upon this base-plate rests a mold-carriage or platform, B. This carriage is perforated with as many circular or otherwise-shaped apertures $a$ as there are molds to be carried at one time upon it. The size and shape of the apertures are such that one end of the mold-cases will fit pretty snugly into them, so that the cases will, by the edges of the apertures, be held firmly in the proper position for the pipes to be molded, and yet so that they may be easily removed from the apertures when the finished pipes are to be discharged from the molds. C is a mold, of which there may be any convenient number. It is composed of a mold-case, $b$, made of thin metal or of any other suitable material, and it is formed in halves, as represented, or otherwise constructed so that it can readily be closed tightly by means of the clamps $c$, or other convenient provision, around the core when it is being prepared for use, and opened after the pipe has been molded and is ready to be discharged from the mold. The mode in which I prefer to make these mold-cases is to provide the shoulders $d$ $d'$ at the ends of the cases, and when the molds are in position on the mold-case, supporting-carriage, or platform B, the shoulder $d$, at one end of the case, will rest upon the edge of the apertures $a$ and form a very convenient means for holding the case in proper position. The core of the mold is shown at D. It may be made of wood, metal, or other suitable material, and it should have such a base or foot as shown at $g$. The diameter of this base, at its lowest part, is sufficient to make it fit snugly into the inside of the mold-case when the latter is properly closed. By this means the internal surface of the mold-case keeps the core at the proper distance from the inner face of the case, the space between the latter and the stem of the core being equal to the intended thickness of the walls of the pipe. It is obvious that the core, when thus secured, cannot change its position during the molding. The diameter of the stem of the core is equal to the intended diameter of the interior of the pipe. The upper side $i$ of the base or foot of the core is designed to shape the lower end of the pipe, and it should have, as represented, a proper configuration for that purpose. If the lower end of the pipe is to be square the part $i$ should be flat.

In the construction shown in the drawing the base-plate A is provided with the same number of apertures $a'$ as the mold-case supporting-carriage or platform B. These apertures should be of sufficient size to permit the core D, when it is to be discharged from the mold, to drop through them into the pit E. In order to force the core into the pit out of the mold and the pipe after the latter has been molded, the lever-handle F, adapted to produce pressure upon the upper end of the core, or any other convenient device, may be employed.

In using molds of this kind it is necessary to provide some support beneath the core to hold it up while the pipe is being molded. In the construction shown in the drawing I effect this by making the platform or mold-carriage B capable of partial rotation around a central hollow axis or shaft, $k$, the rotating movement being imparted to it by the crank-handle and gearing $m$ $n$ or any other suitable means. This capacity of rotation is such that the apertures $a$ in the platform or carriage B can be made to register with the apertures $a'$ in the base-plate A, or they can be made to stand a little—say one half—over these latter apertures, as shown at $o$ $o$, Fig. 1. When the mold is ready to be placed in position for use on the platform or carriage the latter should be rotated, so that the apertures $a$ stand over the apertures $a'$, as thus shown at $o$ $o$. The base or foot of the core D, when the latter is in the mold, will then extend through the aperture $a$ of the platform B and rest on and be supported by the portion $s$ of the base-plate A immediately surrounding the aperture $a'$. In this manner the core will be firmly sustained while the molding is being performed. Above the platform B is what I term a "mixing-table," G, resting on suitable supports $t$ $t$. It is provided with trough-like edges $u$ $u$, and it is designed to receive the material which is to be mixed to form the pipes. Over this table what I term "mixing-plows" $v$ $v$ are arranged as represented upon a suitable frame, $w$ $w$, and this frame is fast upon the shaft I, which latter turns within the central hollow axis or shaft $k$ of the platform B. The shaft $k$ is capable of being rotated at any desired speed by means of the pulleys and cord $x$ $x'$ $y$, actuated by the handle $z$, and its upper end may be provided with one or more notches or serrations, 1, in which corresponding pins or projections 2 on the under side of one of the arms of the frame $w$ $w$ may engage when the frame is dropped or forced downward. When this is done the rotation of the shaft $k$ will cause the frame $w$ $w$ and plows $v$ to turn with it. The lower end of the shaft I is stepped into the upper side of a lever, J, pivoted beneath the base-plate at 1; and when the pipe material has been sufficiently mixed by the rotation of the plows $v$ $v$, and is ready to be shoveled into the molds, the forward end 2 of the lever may be raised by the workman, and the shaft I with the frame and plows thereby elevated above the mixed material so as to be out of the way of the workman when he is shoveling the material off of the table to fill the molds. After being raised the lever is held up by the cord 3, which is passed around its forward end 2, and also around the pin 4 near the crank-shaft $m$. On the top of the machine a receptacle, L, for tools or other articles may be provided, if desired, and above it may be a water-reservoir, L', from which water may be taken by a hose or other means to the material on the mixing-table, for use during the mixing. P is what is termed a "header," and is employed to shape or form the upper end of the pipe. R is a mold-hopper, to receive some of the pipe material from the table G while the pipe is being molded. The use of both these articles is well known and does not require description. $z'$ is a half section of finished pipe ready to be removed from the mold.

The operation of the apparatus is as follows: The mold-carriage or platform B is rotated so as to bring the apertures $a$ out of register with the aperture $a'$ of the base-plate A, as seen at $o$ $o$. Before or after this is done the halves of the mold-case C are put together and secured, and one end of the case is then inserted into one of the apertures $a$ of the platform B. The core D is then placed inside the mold-case, with its foot or base resting upon the portion $s$, immediately surrounding the corresponding aperture $a'$ of the base-plate. The mold-hopper R is next placed on the upper end of the mold-case, and the mold is now ready for use. The workman now takes some of the pipe material from the table G, after he has mixed it by means of the plows $v$ $v$, and shovels it into the mold-hopper R. He then molds the pipe in the usual way, finishing the upper end of it with the header P, as customary, and then, in order to discharge the core, he rotates the platform B sufficiently far to bring the aperture $a$, which supports the mold-case, directly over and in line with the corresponding aperture $a'$, and at the same time beneath the lever-handle F, which should be so placed that when this is done it will be just over the upper end of the core. The lever is now drawn downward, and the pressure thereby produced upon the core forces the latter out of the pipe and mold-case into the pit E. When all of the molds placed upon the platform or carriage have thus been filled and the cores discharged from them, they are removed from the apparatus with the finished pipes in them to allow the latter to stand for a short time until they can safely be discharged from the cases, other empty molds being, in the mean while, placed in the apparatus, and the filling and molding being repeated as before.

It is obvious that instead of discharging the core by rotating the platform or carriage while the base-plate is stationary the latter may be rotated by any convenient means and the platform may be stationary. It is also obvious that other means than the base-plate shown in the drawing may be adopted to sustain the core during the molding operation. Any firm support, such as a post, or block, or roller, placed beneath the lower end of the core, and capable of being drawn away from under it when the core is to be discharged, will answer the purpose. Or the post, or block, or roller may be stationary, and the platform or carriage carrying the mold may be moved away from above it to let the core out. Or a pin may be inserted through the lower edge of the platform into the base or foot of the core, and this pin may be drawn out when the core is to be discharged.

But all these devices, although not new in themselves, would obviously come within the combination which I claim, for the reason that they are merely equivalents for the base-plate with its apertures, shown in the drawing, so that even if these plans were adopted there would still be a mold-case and core having the respective functions above described, combined with a case-supporter and a separate core-supporter, one or the other of which two latter parts would be movable, and the whole operating, as represented, to enable the core to be discharged without requiring the mold-case to be removed from the support on which it rested during the molding operation, and hence dispensing entirely with a core-socket.

Nor is it essential that the provision for supporting the mold-case should be a rotating or other platform, as here represented. Any suitable base or standard which will sustain the case firmly will answer the purpose.

From the foregoing description it will be seen that in my present apparatus, instead of the core being held in position in the mold by a core-socket it is held by the case; instead of the case being supported by the core-socket it is supported by a platform or carriage; and instead of the pipe being sustained in the mold and its lower end shaped by the core-socket it is sustained and shaped by the base of the core itself, while at the same time all the beneficial results of the core-socket combination are obtained.

I make no claim to the mold-case or core, as both are old, the former being found in the before-referred to patent of 1859, and the latter in that of 1854; but Having thus made known my invention, what I claim, and desire to secure by Letters Patent, is—

1. An apparatus for molding drain-pipes and other analogous articles, composed of a mold-case and core, constructed and operating without a core-socket, as described, in combination with a stationary or movable support for the mold-case and with a separate stationary or movable support for the core, the whole combined together to enable the core to be discharged from the case after a pipe has been molded without requiring the case to be removed from the support which sustained it during the molding operation, and without the use of a core-socket, substantially as herein set forth.

2. The arrangement of the "mixing-table" and "mixing-plows" relatively to the molds, substantially in the manner set forth.

M. R. PIERCE.

Witnesses:
M. M. LIVINGSTON,
T. B. BEECHER.